United States Patent
Wallach et al.

(10) Patent No.: US 12,019,725 B2
(45) Date of Patent: Jun. 25, 2024

(54) METHODS AND SYSTEMS FOR EMPLOYING AN EDGE DEVICE TO PROVIDE MULTIFACTOR AUTHENTICATION

(71) Applicant: Johnson Controls Tyco IP Holdings LLP, Milwaukee, WI (US)

(72) Inventors: Walter A. Wallach, San Jose, CA (US); Roman Solodov, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 331 days.

(21) Appl. No.: 17/592,193

(22) Filed: Feb. 3, 2022

(65) Prior Publication Data

US 2023/0244769 A1 Aug. 3, 2023

(51) Int. Cl.
| | |
|---|---|
| G06F 21/32 | (2013.01) |
| G06F 21/40 | (2013.01) |
| G06V 20/40 | (2022.01) |
| G06V 40/16 | (2022.01) |
| G10L 15/08 | (2006.01) |
| G10L 15/25 | (2013.01) |

(52) U.S. Cl.
CPC .............. *G06F 21/32* (2013.01); *G06F 21/40* (2013.01); *G06V 20/40* (2022.01); *G06V 40/161* (2022.01); *G10L 15/08* (2013.01); *G10L 15/25* (2013.01); *G10L 2015/088* (2013.01)

(58) Field of Classification Search
CPC ....... G06F 21/32; G06F 21/40; G06V 40/161; G06V 20/40; G10L 15/08; G10L 15/25; G10L 2015/088

USPC .............................................. 726/2
See application file for complete search history.

(56) References Cited

U.S. PATENT DOCUMENTS

| | | | |
|---|---|---|---|
| 8,984,622 B1 * | 3/2015 | Baldwin | G06V 40/162 726/16 |
| 10,546,183 B2 * | 1/2020 | Rodriguez | G06V 40/45 |
| 11,544,965 B1 * | 1/2023 | Livitz | G06V 40/67 |
| 11,636,195 B2 * | 4/2023 | DeRosa-Grund | G06V 40/167 382/115 |
| 11,704,908 B1 * | 7/2023 | Xu | G06V 40/172 382/181 |
| 2009/0044264 A1 * | 2/2009 | Ramanathan | H04L 63/08 713/186 |
| 2014/0007224 A1 * | 1/2014 | Lu | H04L 9/3231 726/19 |

(Continued)

*Primary Examiner* — Thanh T Le
(74) *Attorney, Agent, or Firm* — ARENTFOX SCHIFF LLP (57) ABSTRACT

A system may be configured to perform edge device based multi-factor authentication. In some aspects, the system may capture a plurality of video frames, detect a first face within a first video frame, detect a second face within a second video frame, generate a first signature based on the first face and a second signature based on the second face, determine that the first signature matches the second signature, determine that a third video frame corresponds to a human, and verify that the first signature and second signature correspond to a first authentication credential of a known user. Further, the system may capture audio information, verify that the audio information corresponds to a second authentication credential of the known user, and provide physical access to a controlled area.

20 Claims, 3 Drawing Sheets (56) References Cited

U.S. PATENT DOCUMENTS

| | | | |
|---|---|---|---|
| 2015/0169943 A1* | 6/2015 | Khitrov | G06V 40/45 382/116 |
| 2016/0150124 A1* | 5/2016 | Panda | G06F 3/1238 358/1.14 |
| 2016/0379042 A1* | 12/2016 | Bourlai | G06V 40/171 382/118 |
| 2017/0186428 A1* | 6/2017 | Kunitake | G10L 17/06 |
| 2017/0193286 A1* | 7/2017 | Zhou | G06V 40/172 |
| 2018/0129795 A1* | 5/2018 | Katz-Oz | H04L 63/10 |
| 2018/0232511 A1* | 8/2018 | Bakish | G06F 21/32 |
| 2019/0384965 A1* | 12/2019 | Rodriguez | G06V 40/161 |
| 2020/0152189 A1* | 5/2020 | Kuo | G10L 25/21 |
| 2021/0174809 A1* | 6/2021 | Yamada | G10L 15/1815 |
| 2021/0327431 A1* | 10/2021 | Stewart | G06V 40/45 |
| 2022/0058382 A1* | 2/2022 | LiVoti | G10L 25/51 |
| 2022/0093101 A1* | 3/2022 | Krishnan | G10L 15/063 |
| 2022/0292170 A1* | 9/2022 | Khadloya | G06F 21/32 |
| 2023/0031087 A1* | 2/2023 | Tussy | H04W 12/06 |
| 2023/0074732 A1* | 3/2023 | Howard | G06V 40/172 |
| 2023/0142898 A1* | 5/2023 | Chien | G06F 21/629 713/186 |
| 2023/0206231 A1* | 6/2023 | Saad | G06Q 20/4016 705/75 |
| 2023/0246828 A1* | 8/2023 | Tandy | H04L 9/3247 713/171 |

\* cited by examiner

METHODS AND SYSTEMS FOR EMPLOYING AN EDGE DEVICE TO PROVIDE MULTIFACTOR AUTHENTICATION

BACKGROUND

Statement of the Technical Field

The present disclosure relates generally to biometric authentication. More particularly, the present disclosure relates to implementing systems and methods for performing multi-factor authentication via an edge device.

Description of the Related Art

A common form of authentication verifies the identity of an entity by requiring the entity to provide an alphanumeric string, and comparing the string to a secret (e.g., a password, a social security number, etc.) previously provided by the entity. In order to enhance the security of authentication systems, biometric methods are increasingly being deployed to validate the authenticity of users that want to access systems or other protected environments. By means of such biometric methods, the identity of a person is not only tied to something a person knows, e.g. a password or PIN, or something a person has, e.g. a smart card, but also to something a person is. However, many biometric systems are inaccurate, cumbersome to deploy, untimely, and require distributed processing and a remote authentication server. Further, in some instances, an authentication system may employ multi-factor authentication (MFA) as another means of enhancing the security of the authentication system. But multi-factor authentication may be weakened by an insecure factor.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for employing an edge device to perform MFA. In an aspect, a method for multi-pass multi-object tracking may comprise capturing, by a video capture component of an edge device, a plurality of video frames; detecting, by the edge device, a first face within a first video frame of the plurality of video frames; detecting, by the edge device, a second face within a second video frame of the plurality of video frames; generating, by the edge device, a first signature based on the first face and a second signature based on the second face; determining, by the edge device, that the first signature matches the second signature; determining, by the edge device, that a third video frame of the plurality of video frames corresponds to a human within a field of view of the video capture component; verifying that the first signature and the second signature correspond to a first authentication credential of a known user; capturing, by an audio capture component of the edge device, audio information; verifying that the audio information corresponds to a second authentication credential of the known user; and providing physical access to a controlled area based on the first signature and second signature corresponding to the first authentication credential and the audio information corresponding to the second authentication credential.

The present disclosure includes a system having devices, components, and modules corresponding to the steps of the described methods, and a computer-readable medium (e.g., a non-transitory computer-readable medium) having instructions executable by a processor to perform the described methods. In some aspects, non-transitory computer-readable media may exclude transitory signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide edge device based multi-factor authentication. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one or more problems solved by the present solution are authentication inaccuracy, and cumbersome authentication implementation. For example, this present disclosure describes systems and methods for an edge device configured to perform secure MFA based on video frames captured by an internal video capture component or an external video capture device. In some aspects, the edge device may be configured to verify that an authenticating entity is actively providing biometric information and not using previously captured biometric information. Further, in some aspects, the edge device may be configured to verify that the authenticating entity is not accompanied by another person seeking to gain unauthorized access to a restricted location or protected resource. The present solution provides improved accuracy and ease of deployment for MFA through use of less complex edge devices.

Figure 1:
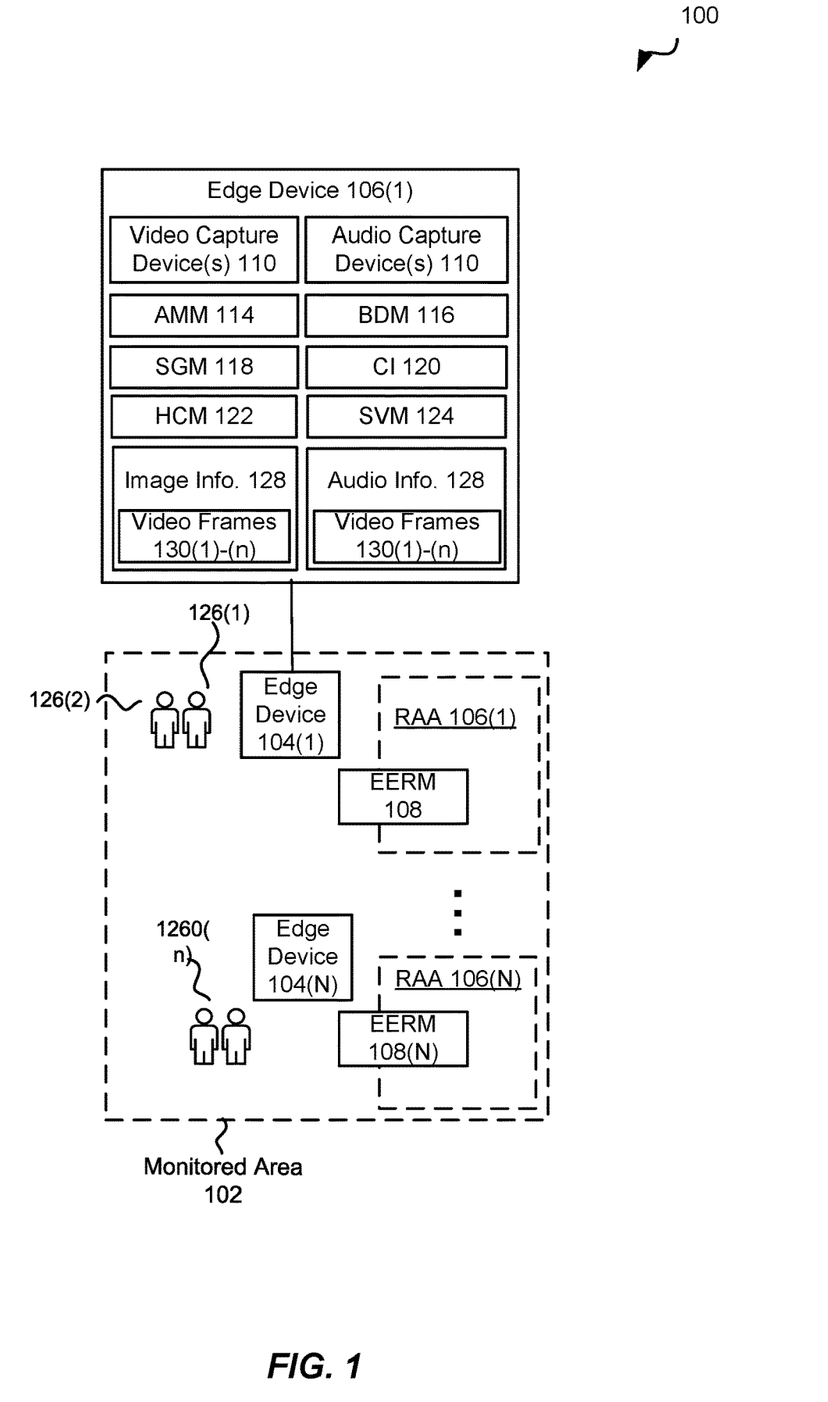
FIG. 1 is a diagram illustrating an example system for employing an edge device to provide multi-factor authentication, according to some implementations.

Referring to FIG. 1, in one non-limiting aspect, a system 100 within a controlled environment 102 is configured to perform edge device based multi-factor authentication. As used herein, in some embodiments, "authentication" may refer to a process by which an entity (e.g., a user, a device, or a process) makes their identity known to a computing system. Further, authentication may be based on at least one of information an entity knows (e.g., a password, a PIN code, a digital certificate, a secret, a cryptographic key, a social security number, a zip code, a phone number, etc.), an object an entity possesses (e.g., a smart card, a hardware token, a dynamic password generator, etc.), or something an entity is (e.g., a fingerprint, a voiceprint, a retinal scan, etc.). In addition, as used herein, in some embodiments, "multi-factor authentication" may refer to an authentication process in which more than one form of authentication is used to validate the identity of an entity.

In some aspects, the system 100 may include at least one of a surveillance system, entry system, and/or intrusion system. Further, the controlled environment 102 may include one or more edge devices 104(1)-(n) for controlling access to one or more restricted access areas 106(1)-(n) within the controlled environment 102. In some aspects, an "edge device" may refer to an internet of things (IoT) device that internally performs data processing. In some aspects, an edge device may be less resource intensive, and have a miniature form factor that provides quick and efficient deployment in comparison to distributed systems that require a centralized server to perform an authentication process. Some examples of restricted access areas 106(1)-(n) include rooms, hallways, parking lots, the interior of a building, the exterior of a building, the roof of the building, etc. Further, the controlled environment 102 may include entry/exit restriction mechanisms (EERMs) 108(1)-(n) for permitting and denying access to the restricted access areas 106(1)-(n). Some examples of the EERMs 108 include automated door locks, door sensors, turnstiles, gated entries, badge systems, etc. As another example, the controlled environment 102 may be a road or parking garage, and the EERM 108 may be a security checkpoint for controlling automobile access. Alternatively, in some aspects, an edge device 104 may be used to perform access to a digital resource.

As described in detail herein, the edge devices 104(1)-(n) may be installed within a predetermined distance to the restricted access areas 106(1)-(n), and control the EERMs 108(1)-(n) to permit or deny access to the restricted access areas 106(1)-(n). In some examples, a first edge device 104(1) may control access to the restricted access area 106(1) via the first EEMR 108(1), an nth edge device 104(n) may control access to the nth restricted access area 106(n) via the nth EEMR 108(n), and so forth. As illustrated FIG. 1, an edge device (e.g., the edge device 104(1)) may include one or more video capture device(s) 110, one or more audio capture device(s) 112, an authentication management module 114, a biometric detection module 116, a signature generation module 118, credential information 120, a human confirmation module 122, and a signature verification module 124.

As illustrated in FIG. 1, an occupant 126(1) of the controlled environment 102 may endeavor to enter a restricted access area 106(1). As such, the occupant 126(1) may stand or otherwise position herself within a field of view of the one or more video capture devices 110 of the first edge device 104(1) configured to control access to the restricted active area 106(1), and perform a multifactor authentication process managed by the authentication management module 114. In some aspects, the authentication management module 114 may prompt an occupant 126 to perform specific actions in order to complete multifactor authentication. For example, the authentication management module 114 may instruct the occupant 126(1) to occupy the field of view of one or more video capture devices 110. Once the occupant 126(1) is within the field of view of the one or more video capture devices 110, the one or more video capture devices 110 may generate image information 128 including video frames 130(1)-(n).

In some examples, the one or more video capture devices 110 may include a visible light camera and/or an infrared camera. In some aspects, for each video frame 130, the image information 128 may include location information identifying a location where the particular video frame 130 was captured, a device identifier identifying the video capture device 110 that captured the particular video frame 130, a timestamp identifying a date and/or time when the particular video frame 130 was captured, a stream identifier, and/or a temperature of an object or subject of the particular video frame 130.

In some aspects, the biometric detection module 116 may be configured to detect a face or biometric related pattern (e.g., a vascular pattern) within a video frame 130. For example, the biometric detection module 116 may be configured to detect a face in the video frames 130(1)-(n) captured by the video capture device 110(1) while the occupant 126(1) attempts to authenticate to the edge device 104(1). In some aspects, the biometric detection module 116 may employ a convolution neural network to detect objects within the video frames 130(1)-(n). Additionally, or alternatively, the biometric detection module 116 may employ one or more other machine learning (ML) techniques to detect objects within the video frames 130(1)-(n).

In some aspects, the signature generation module 118 may be configured to generate signatures 132(1)-(n) based on the video frames 130(1)-(n). For example, the signature generation module 118 may generate an image vector representation for each face detected within the one of the video frames 130(1)-(n) captured by the video capture devices 110. In some examples, the signatures 132(1)-(n) may include a list, an array, or a tensor of numerical values representing the attributes of the corresponding face within a video frame 130. In some examples, the signature generation module 118 may further be configured to determine a quality value of a video frame 130. Further, if the quality value is below a first predefined threshold, the signature generation module 118 may apply one or more techniques to improve the quality of the video frame 130 to generate a repaired video frame 134, and generate the signature 132 of a face detected within the video frame 130 from the detected face within the repaired video frame 134. Additionally, or alternatively, the signature generation module 118 may determine that the quality value of a video frame 130 is below a second predefined threshold and discard the video frame 130, or determine that the quality value of the repaired video frame 134 is below the first or second predefined threshold and discard the repaired video frame 134.

In some aspects, the signature verification module 124 may be configured to determine that a first face detected within a first video frame 130(1) belongs to the same occupant 126(1) as a second face detected within one or more subsequent video frames (e.g., a second video frame 130(2)). For example, the signature verification module 124 may determine a distance between a vector generated based on the first detected face and a vector generated based on the second detected face, and determine that the detected faces belong to the same occupant 126(1) when the distance is below predefined threshold. In some instances, ensuring that a plurality of faces detected within a plurality of video frames captured by an edge device 104 are within a predefined distance within a preconfigured period time may indicate that first occupant 126(1) is not accompanied by a second occupant 126(2) that is not authorized to enter the restricted access area 106. In some aspects, the signature verification module 124 employ one or more image similarity techniques. In some examples, the signature verification module 124 may implement at least one of a histogram based approach (e.g., conventional histogram intersection (HI), merged palette histogram matching (MPHM), gaussian weighted histogram intersection (GWHI), color ratio gradients (CRG), color edge co-occurrence histogram (CECH), etc.) customer feature based approach (e.g., scale-invariant feature transform (SIFT), histogram of gradients (HOG), etc.), distance metric learning approach (e.g., principal component analysis (PCA), linear discriminant analysis (LDA), neighborhood component analysis (NCA), large margin nearest neighbor (LMNN), etc.), and/or a deep neural network approach (e.g., a Siamese neural network).

In some aspects, the human confirmation module 122 may be configured to determine that the occupant 126(1) performing the authentication process did not attempt to use a picture to authenticate. In some instances, the authentication management module 114 may instruct the occupant 126(1) to perform an action and detect performance of the action to determine whether the occupant 126(1) is using a photograph (e.g., a photograph of an authorized occupant) or other representation during the authentication process. For example, one or more of the video frames 130(1)-(n) may be captured with the occupant 126(1) facing the edge device 104(1). Further, the human confirmation module 122 may instruct the occupant 126(1) to turn and permit the edge device 104(1) to capture one or more of the video frames 130 in profile. In addition, the human confirmation module 122 may determine that occupant 126(1) is not attempting to use a picture to authenticate to the authentication management module 114, and proceed with authenticating the occupant 126(1) using the video frames 130. In some other aspects, the video capture device 110 may capture metadata that may be analyzed to determine whether the occupant 126 is using a photograph or other representation during the authentication process. For example, the video capture device 110 may generate the image information 128 including a temperature of an object or subject of a particular video frame 130. In addition, the human confirmation module 122 may determine that occupant 126 is not attempting to use a picture of an authorized occupant to authenticate to the authentication management module 114 when the temperature is within a range of a predefined temperature corresponding to image capture of a human being. In yet still some other examples, the human confirmation module 122 may instruct the occupant 126(1) to utter one or more phrases. Further, the human confirmation module 122 may determine that the occupant 126 is not attempting to use a picture of an authorized occupant to authenticate to the authentication management module 114 based on detecting movement of the face. As described below, audio information and/or motion information associated with the utterance of the phase may be further used by the signature verification module 124.

Further, the signature verification module 124 may be further configured to compare the signatures 132(1)-(n) to the credential information 120 to complete a first factor of a multi-factor authentication process. In some aspects, the credential information 120 may include signatures of authorized occupants generated during an enrollment process. For instance, the credential information 120 may include a hash of a signature of the face of an authorized occupant generated during an enrollment process that captures an authorized person. As an example, the signature verification module 124 may compare the signature 132(1) to the credential information 120 to determine if the occupant 126 is an authorized occupant, i.e., the occupant has previously provided credential information 120 to the system 100 or an entity associated with the system 100 during an enrollment process. In some examples, the credential information 120 may be received from a remote entity via a network.

In some aspects, the one or more audio capture devices 112 may capture audio information 136 to authenticate during the second factor of the multi-factor authentication process. In some examples, the signature generation module 118 may generate signatures 138(1)-(n) based on the audio information 136, and the signature verification module 124 may analyze the signatures 138(1)-(n) and/or compare the signatures 138(1)-(n) to the credential information 120 to complete the second factor of a multi-factor authentication process. In some aspects, the video capture devices 110 may capture video frames 130 during the capture of the audio information 136, and the signature verification module 124 may determine if one or more attributes of motion information (e.g., movement of the lips) determined from the video frames 130 during utterance of the content of the audio information 136 match uttered phrases detected within the audio information 136. Additionally, or alternatively, the signature verification module 124 may confirm whether the one or more voice attributes (e.g., a voiceprint) determined from the audio information 136 match one or more voice attributes (e.g., a reference voiceprint) associated with the authorized occupant identified during the first factor of the multi-factor authentication process. Additionally, or alternatively, the signature verification module 124 may confirm whether a passphrase uttered during the capture of the audio information 136 matches a passphrase associated with the authorized occupant identified during the first factor of the multi-factor authentication process. For example, the motion information may capture the movement of at least the lips and mouth of the occupant 126 while the audio information 136 is captured, and the signature verification module 124 may determine if the motion information matches credential information 120 associated with pronunciation of a particular word by the authorized occupant identified by the first factor of the multi-factor authentication process.

In some aspects, if the signature verification module 124 may be configured to determine that a first face detected within a first video frame 130(1) belongs to the same occupant 126(1) as a second face detected within a second video frame 130(2), the human confirmation module 122 determines that the occupant 126(1) is not presenting a photograph to the edge device 104, the signature verification, the signatures 132 generated from video capture of the occupant 126(1) match the credential information 120, and the occupant 126(1) successfully completes the second factor of the multifactor authentication process (e.g., provides audio information including a passphrase matching a passphrase within the credential information 120 associated with the occupant 126(1), the authentication management module 114 may instruct an EERM 108(1) to provide access to a restricted access area 106(1).

Figure 2:
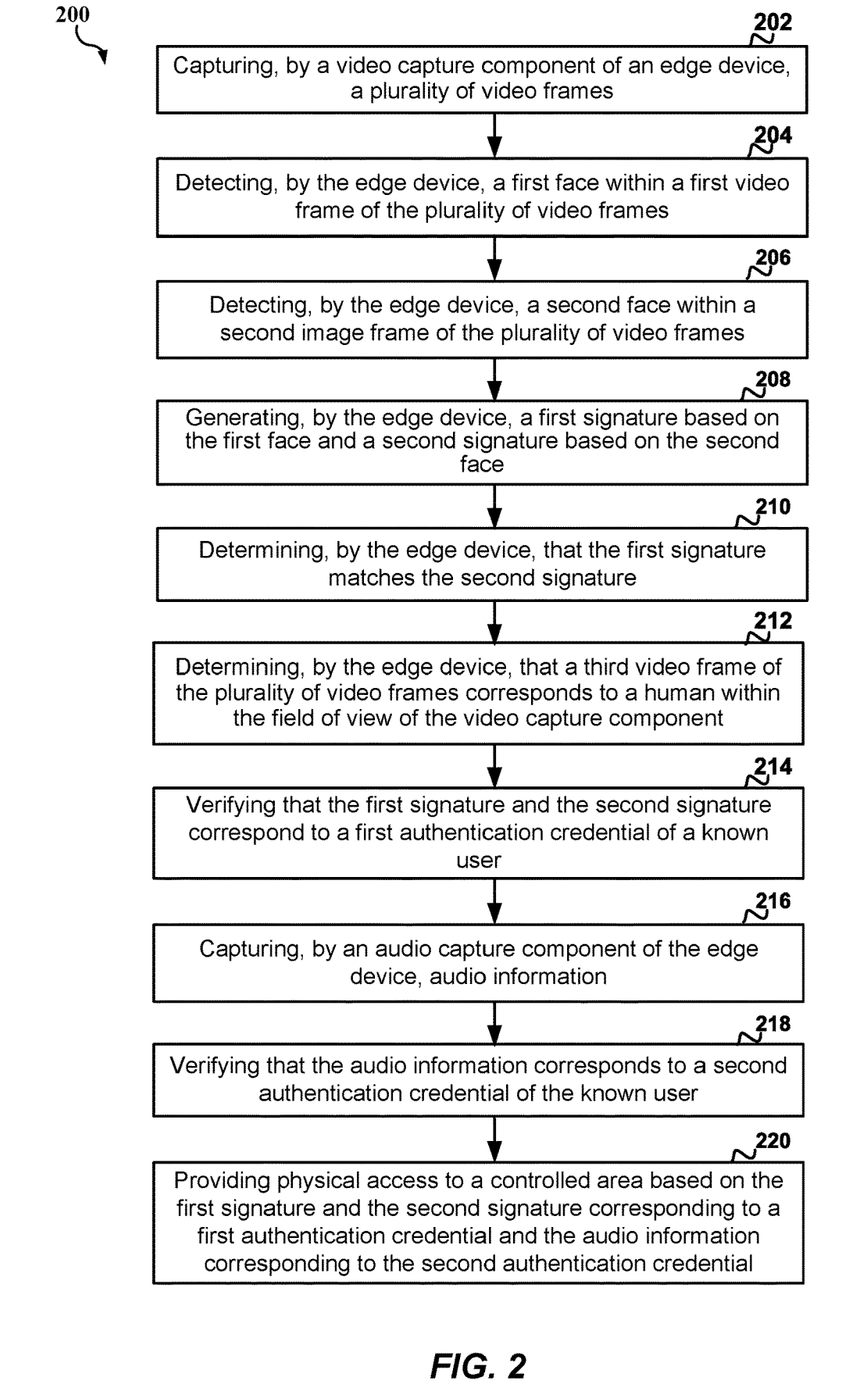
FIG. 2 is a flow diagram of an example method of employing an edge device to provide multi-factor authentication, according to some implementations.

FIG. 2 is a flow diagram of an example method of multi-factor authentication, according to some implementations. Referring to FIG. 2, in operation, the edge device 104 or the computing device 300 may perform an example method 200 for multi-factor authentication. The method 200 may be performed by one or more components of the edge device 104, the computing device 300, or any device/component described herein according to the techniques described with reference to FIG. 1.

At block 202, the method 200 includes capturing, by a video capture component of an edge device, a plurality of video frames. For example, the video capture device 110(1) may capture the video frames 130 of the occupant 126(1). In some aspects, the video capture device 110(1) may be internal to the edge device 104. In some other aspects, the video capture device 110(1) may be external to the edge device 104 and transmit the video frames 130 (and corresponding audio information) to the edge device 104. Accordingly, the edge device 104, the video capture devices 110, the computing device 300, and/or the processors 302 may provide means for capturing, by a video capture component of an edge device, a plurality of video frames.

At block 204, the method 200 includes detecting, by the edge device, a first face within a first video frame of the plurality of video frames. For example, the biometric detection module 116 may detect a first face within the first video frame 130(1). Accordingly, the edge device 104, the computing device 300, and/or the processors 302 executing the biometric detection module 116 may provide means for detecting, by the edge device, a first face within a first video frame of the plurality of video frames.

At block 206, the method 200 includes detecting, by the edge device, a second face within a second video frame of the plurality of video frames. For example, the biometric detection module 116 may detect a second face within the second video frame 130(2). In some aspects, the biometric detection module 116 may detect at least five faces each from a different video frame of the plurality of video frames 130(1)-(n). In some aspects, the fives faces may be detected within a sequence of video frames 130. For example, the five faces may be detected in the video frames 130(1)-(5). Accordingly, the edge device 104, the computing device 300, and/or the processors 302 executing the biometric detection module 116 may provide means for detecting, by the edge device, a second face within a second video frame of the plurality of video frames.

At block 208, the method 200 includes generating, by the edge device, a first signature based on the first face and a second signature based on the second face. For example, the signature generation module 118 may determine a first signature 132(1) based on the first face or a component of the first face (e.g., a vascular pattern of an eye of the first face), and a second signature 132(2) based on the second face a component of the second face (e.g., a vascular pattern of an eye of the second face). In some aspects, the signature generation module 118 may generate at least five signatures 132(1)-(5) each based on an individual face detected in the video frames 130(1)-(5). Accordingly, the edge device 104, the computing device 300, and/or the processors 302 executing the signature generation module 118 may provide means for generating, by the edge device, a first signature based on the first face and a second signature based on the second face.

At block 210, the method 200 includes determining, by the edge device, that the first signature matches the second signature. For example, the signature verification module 124 may determine that a distance between the first signature 132(1) and the second signature 132(2) is below a predefined threshold. As used herein, in some aspects, "matching" may refer to a difference and/or distance between the first signature and the second signature being less than a threshold amount. Additionally, or alternatively, in some aspects, "matching" may refer to the probability that the signatures belong to the subject being above a predefined threshold. Further, in some aspects, the signature verification module 124 may determine that at least five signatures 132(1)-(5) match (i.e., correspond to a single person). Accordingly, the edge device 104, the computing device 300, and/or the processors 302 executing the signature verification module 124 may provide means for determining, by the edge device, that the first signature matches the second signature.

At block 212, the method 200 includes determining, by the edge device, that a third video frame of the plurality of video frames corresponds to a human within a field of view of the video capture component. For example, the human confirmation module 122 may determine that an object detected within the video frame 130(3) corresponds to a human being and not a photograph. Accordingly, the edge device 104, the computing device 300, and/or the processors 302 executing the human confirmation module 122 may provide means for determining, by the edge device, that a third video frame of the plurality of video frames corresponds to a human within a field of view of the video capture component.

At block 214, the method 200 includes verifying that the first signature and the second signature correspond to a first authentication credential of a known user. For example, the signature verification module 124 may confirm that the first signature and/or the second signature match a signature within the credential information 120 associated with an authorized occupant 126. Accordingly, the edge device 104, the computing device 300, and/or the processors 302 executing the signature verification module 124 may provide means for verifying that the first signature and the second signature correspond to a first authentication credential of a known user.

At block 216, the method 200 includes capturing, by an audio capture component of the edge device, audio information. For example, the one or more audio capture devices 112 may capture the audio information 136 to authenticate during the second factor of the multi-factor authentication process. Accordingly, the edge device 104, the audio capture devices 112, the computing device 300, and/or the processors 302 may provide means for capturing, by an audio capture component of the edge device, audio information.

At block 218, the method 200 includes verifying that the audio information corresponds to a second authentication credential of the known user. For example, the signature generation module 118 may generate signatures 138(1)-(n) based on the audio information 136, and the signature verification module 124 may compare the credential information 120 to complete the second factor of a multi-factor authentication process. Accordingly, the edge device 104, the computing device 300, and/or the processors 302 executing the signature generation module 118 and the signature verification module 124 may provide means for verifying that the audio information corresponds to a second authentication credential of the known user.

At block 220, the method 200 includes providing physical access to a controlled area based on the first signature and second signature corresponding to the first authentication credential and the audio information corresponding to the second authentication credential. For example, if the signature verification module 124 determines that a first face detected within a first video frame 130(1) belongs to the same occupant 126(1) as a second face detected within a second video frame 130(2), the human confirmation module 122 determines that the occupant 126(1) is not presenting a photograph to the edge device 104, the signature verification module 124 determines that the signatures 132 generated from video capture of the occupant 126(1) match the credential information 120, and the occupant 126(1) successfully completes the second factor of the multifactor authentication process (e.g., provides audio information including a passphrase matching a passphrase within the credential information 120 associated with the occupant 126(1), the authentication management module 114 may instruct an EERM 108(1) to provide access to a restricted access area 106(1). Alternatively, if the signatures 132 generated from video capture of the occupant 126(1) do not match each other or the credential information 120, or the occupant 126(1) fails to successfully complete the second factor of the multifactor authentication process, the authentication management module 114 may deny access to the restricted access area 106(1). Accordingly, the edge device 104, the computing device 300, and/or the processors 302 executing the authentication management module 114 may provide means for providing physical access to a controlled area based on the first signature and second signature corresponding to the first authentication credential and the audio information corresponding to the second authentication credential.

Further, in some aspects, the method 200 may be performed in parallel for two different sets of faces across the same plurality of video frames 130(1)-(n). For example, the method 200 may be performed for a first set of faces detected within the video frames 130(1)-(5) associated with the first occupant 126(1) and a second set of faces detected within the video frames 130(1)-(5) associated with the second occupant 126(2). Further, the authentication management module 114 may provide physical access to a controlled area based at least in part on both sets of faces correspond to authorized occupants.

Figure 3:
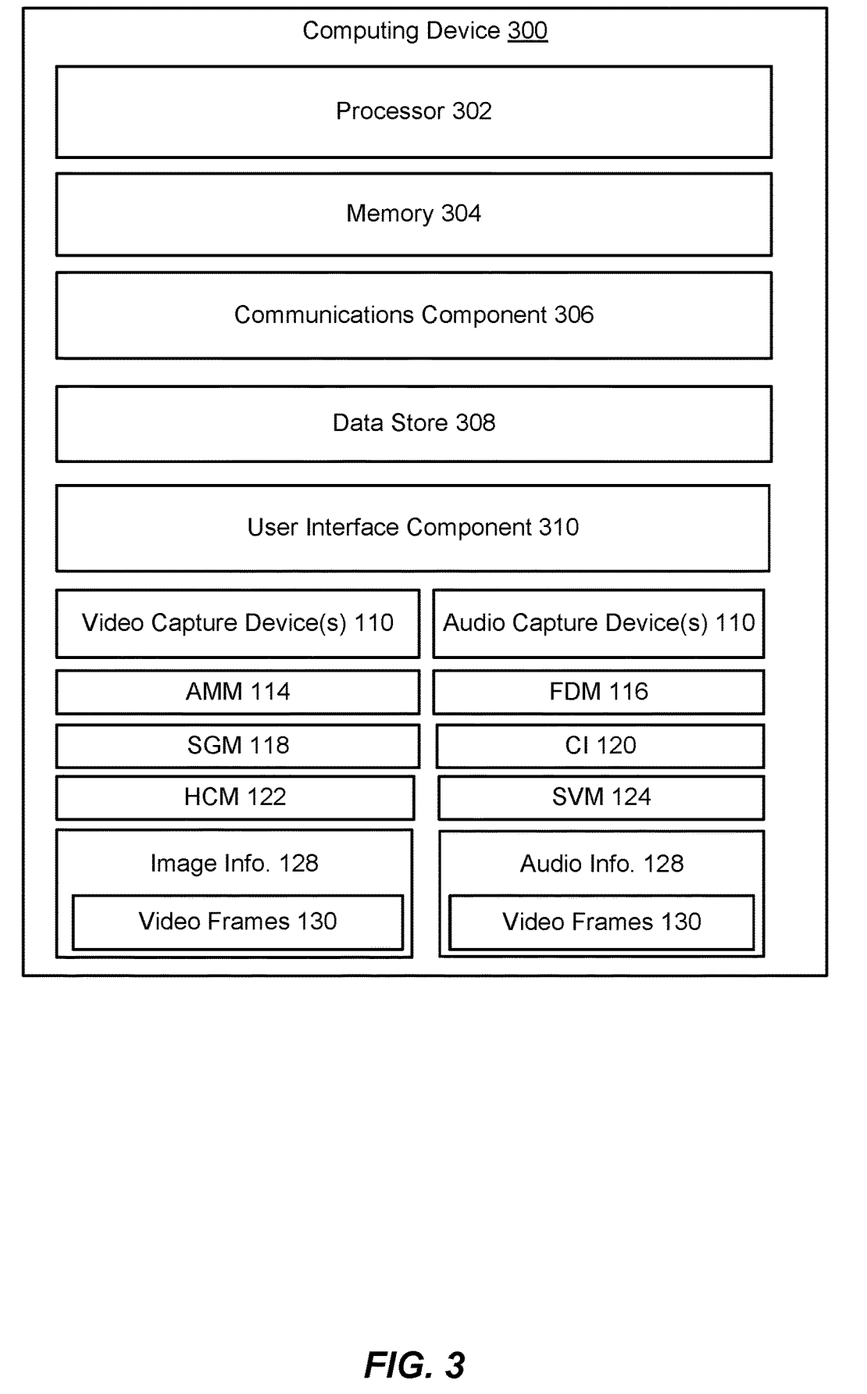
FIG. 3 is block diagram of an example of an edge device configured to implement multi-factor authentication, according to some implementations.

Referring to FIG. 3, a computing device 300 may implement all or a portion of the functionality described herein. The computing device 300 may be or may include or may be configured to implement the functionality of at least a portion of the system 100, or any component therein. For example, the computing device 300 may be or may include or may be configured to implement the functionality of the edge device 104. The computing device 300 includes a processor 302 which may be configured to execute or implement software, hardware, and/or firmware modules that perform any functionality described herein. For example, the processor 302 may be configured to execute or implement software, hardware, and/or firmware modules that perform any functionality described herein with reference to the one or more video capture devices 110, one or more audio capture devices 112, an authentication management module 114, a biometric detection module 116, a signature generation module 118, credential information 120, a human confirmation module 122, a signature verification module 124, or any other component/system/device described herein.

The processor 302 may be a micro-controller, an application-specific integrated circuit (ASIC), a digital signal processor (DSP), or a field-programmable gate array (FPGA), and/or may include a single or multiple set of processors or multi-core processors. Moreover, the processor 302 may be implemented as an integrated processing system and/or a distributed processing system. The computing device 300 may further include a memory 304, such as for storing local versions of applications being executed by the processor 302, related instructions, parameters, etc. The memory 304 may include a type of memory usable by a computer, such as random access memory (RAM), read only memory (ROM), tapes, magnetic discs, optical discs, volatile memory, non-volatile memory, and any combination thereof. Additionally, the processor 302 and the memory 304 may include and execute an operating system executing on the processor 302, one or more applications, display drivers, and/or other components of the computing device 300.

Further, the computing device 300 may include a communications component 306 that provides for establishing and maintaining communications with one or more other devices, parties, entities, etc. utilizing hardware, software, and services. The communications component 306 may carry communications between components on the computing device 300, as well as between the computing device 300 and external devices, such as devices located across a communications network and/or devices serially or locally connected to the computing device 300. In an aspect, for example, the communications component 306 may include one or more buses, and may further include transmit chain components and receive chain components associated with a wireless or wired transmitter and receiver, respectively, operable for interfacing with external devices.

Additionally, the computing device 300 may include a data store 308, which can be any suitable combination of hardware and/or software, that provides for mass storage of information, databases, and programs. For example, the data store 308 may be or may include a data repository for applications and/or related parameters not currently being executed by processor 302. In addition, the data store 308 may be a data repository for an operating system, application, display driver, etc., executing on the processor 302, and/or one or more other components of the computing device 300.

The computing device 300 may also include a user interface component 310 operable to receive inputs from a user of the computing device 300 and further operable to generate outputs for presentation to the user (e.g., via a display interface to a display device). The user interface component 310 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 310 may include one or more output devices, including but not limited to a display interface, a speaker, a haptic feedback mechanism, a printer, any other mechanism capable of presenting an output to a user, or any combination thereof.

Further, while the figures illustrate the components and data of the edge device 104 as being present in a single location, these components and data may alternatively be distributed across different computing devices and different locations in any manner. Consequently, the functions may be implemented by one or more service computing devices, with the various functionality described herein distributed in various ways across the different computing devices 300. Multiple computing devices 300 may be located together or separately, and organized, for example, as virtual servers, server banks and/or server farms. The described functionality may be provided by the servers of a single entity or enterprise, or may be provided by the servers and/or services of multiple different buyers or enterprises.

What is claimed is:

1. A method of authentication for access control, comprising:
   capturing, by a video capture component of an edge device, a plurality of video frames;
   detecting, by the edge device, a first face within a first video frame of the plurality of video frames;
   detecting, by the edge device, a second face within a second video frame of the plurality of video frames;
   generating, by the edge device, a first signature based on the first face and a second signature based on the second face;
   determining, by the edge device, that the first signature matches the second signature;
   determining, by the edge device, that a third video frame of the plurality of video frames corresponds to a human within a field of view of the video capture component;
   verifying that the first signature and the second signature correspond to a first authentication credential of a known user;
   capturing, by an audio capture component of the edge device, audio information;
   verifying that the audio information corresponds to a second authentication credential of the known user; and
   providing physical access to a controlled area based on the first signature and the second signature corresponding to the first authentication credential and the audio information corresponding to the second authentication credential.

2. The method of claim 1, wherein generating the first signature based on the first face and the second signature based on the second face, comprises:
   determining an image quality attribute of the first video frame is a below a predefined threshold;
   enhancing the image quality attribute to create an enhanced video frame; and
   generating the first signature based on the enhanced video frame.

3. The method of claim 1, wherein the first signature is a first vector, the second signature is a second vector, and determining that the first signature matches the second signature, comprises:
   determining that a distance between the first vector and the second vector is less than a predefined threshold.

4. The method of claim 1, wherein the first authentication credential is reference vascular pattern information associated with the known user, and verifying that the first signature and the second signature correspond to the first authentication credential of the known user, comprises:
   identifying a vascular pattern within the first video frame; and
   determining that a difference between the vascular pattern and the reference vascular pattern information is below a predefined threshold.

5. The method of claim 1, wherein the video capture component includes an infrared camera, and determining that the third video frame corresponds to the human, comprises:
   identifying a temperature associated with a capture of the third video frame; and
   determining that the temperature is greater than a predefined threshold.

6. The method of claim 1, wherein determining that the third video frame corresponds to the human, comprises:
   prompting a subject to stand in a particular orientation with respect to the edge device; and
   determining, based on the third video frame, that a detected object within the third video frame is standing in the particular orientation with respect to the edge device.

7. The method of claim 1, wherein verifying that the audio information corresponds to the second authentication credential of the known user, comprises:
   determining that one or more words recited within the audio information match a passphrase of the second authentication credential.

8. The method of claim 1, wherein verifying that the audio information corresponds to the second authentication credential of the known user, comprises:
   determining that facial movement captured by the edge device during capture of the audio information corresponds to a passphrase of the second authentication credential.

9. The method of claim 1, further comprising:
   presenting, via a graphical user interface coupled with the edge device, a graphical image associated with the known user based on the first signature and the second signature corresponding to the first authentication credential and the audio information corresponding to the second authentication credential.

10. An edge device, comprising:
    a memory storing computer-executable instructions; and
    at least one processor coupled with the memory and configured to execute the computer-executable instructions to:
       capture, by a video capture component of the edge device, a plurality of video frames;
       detect, by the edge device, a first face within a first video frame of the plurality of video frames;
       detect, by the edge device, a second face within a second video frame of the plurality of video frames;
       generate, by the edge device, a first signature based on the first face and a second signature based on the second face;
       determine, by the edge device, that the first signature matches the second signature;

determine, by the edge device, that a third video frame of the plurality of video frames corresponds to a human within a field of view of the video capture component;

verify that the first signature and the second signature correspond to a first authentication credential of a known user;

capture, by an audio capture component of the edge device, audio information;

verify that the audio information corresponds to a second authentication credential of the known user; and provide physical access to a controlled area based on the first signature and the second signature corresponding to the first authentication credential and the audio information corresponding to the second authentication credential.

11. The edge device of claim 10, wherein to generate the first signature based on the first face and the second signature based on the second face, the at least one processor is further configured to:

determine an image quality attribute of the first video frame is a below a predefined threshold;

enhance the image quality attribute to create an enhanced video frame; and generate the first signature based on the enhanced video frame.

12. The edge device of claim 10, wherein the first signature is a first vector, the second signature is a second vector, and to generate the first signature based on the first face and the second signature based on the second face, the at least one processor is further configured to:

determine that a distance between the first vector and the second vector is less than a predefined threshold.

13. The edge device of claim 10, wherein the first authentication credential is reference vascular pattern information associated with the known user, and to verify that the first signature and the second signature correspond to the first authentication credential of the known user, the at least one processor is further configured to:

identify a vascular pattern within the first video frame; and determine that a difference between the vascular pattern and the reference vascular pattern information is below a predefined threshold.

14. The edge device of claim 10, wherein the video capture component includes an infrared camera, and to determine that the third video frame corresponds to the human, the at least one processor is further configured to:

identify a temperature associated with a capture of the third video frame; and determine that the temperature is greater than a predefined threshold.

15. The edge device of claim 10, wherein to determine that the third video frame corresponds to the human, the at least one processor is further configured to:

prompt a subject to stand in a particular orientation with respect to the edge device; and determine, based on the third video frame, that a detected object within the third video frame is standing in the particular orientation with respect to the edge device.

16. The edge device of claim 10, wherein to verify that the audio information corresponds to the second authentication credential of the known user, the at least one processor is further configured to:

determine that one or more words recited within the audio information match a passphrase of the second authentication credential.

17. The edge device of claim 10, wherein the at least one processor is further configured to:

present, via a graphical user interface coupled with the edge device, a graphical image associated with the known user based on the first signature and the second signature corresponding to the first authentication credential and the audio information corresponding to the second authentication credential.

18. A non-transitory computer-readable device having instructions stored thereon that, when executed by at least one computing device, cause the at least one computing device to perform operations comprising:

capturing, by a video capture component of an edge device, a plurality of video frames;

detecting, by the edge device, a first face within a first video frame of the plurality of video frames;

detecting, by the edge device, a second face within a second video frame of the plurality of video frames;

generating, by the edge device, a first signature based on the first face and a second signature based on the second face;

determining, by the edge device, that the first signature matches the second signature;

determining, by the edge device, that a third video frame of the plurality of video frames corresponds to a human within a field of view of the video capture component;

verifying that the first signature and the second signature correspond to a first authentication credential of a known user;

capturing, by an audio capture component of the edge device, audio information;

verifying that the audio information corresponds to a second authentication credential of the known user; and providing physical access to a controlled area based on the first signature and the second signature corresponding to the first authentication credential and the audio information corresponding to the second authentication credential.

19. The non-transitory computer-readable device of claim 18, wherein generating the first signature based on the first face and the second signature based on the second face, comprises:

determining an image quality attribute of the first video frame is a below a predefined threshold;

enhancing the image quality attribute to create an enhanced video frame; and generating the first signature based on the enhanced video frame.

20. The non-transitory computer-readable device of claim 18, wherein verifying that the audio information corresponds to the second authentication credential of the known user, comprises:

determining that one or more words recited within the audio information match a passphrase of the second authentication credential.

* * * * *